United States Patent [19]

Haggan

[11] Patent Number: 4,605,844

[45] Date of Patent: Aug. 12, 1986

[54] COMPUTERIZED TRANSACTION CARD WITH INDUCTIVE DATA TRANSFER

[75] Inventor: Douglas E. Haggan, Somerset County, N.J.

[73] Assignee: AT&T Technologies, Inc., Berkeley Heights, N.J.

[21] Appl. No.: 700,152

[22] Filed: Feb. 11, 1985

[51] Int. Cl.[4] .............................................. G06K 5/00
[52] U.S. Cl. ..................... 235/380; 235/492
[58] Field of Search ................. 235/380, 492

[56] References Cited

U.S. PATENT DOCUMENTS 3,022,381  2/1962  Pferd .
3,169,168  2/1965  Capranica .
4,480,178  10/1984  Miller ................................ 235/380

OTHER PUBLICATIONS

"Smart Credit Cards: The Answer to Cashless Shopping", by Stephen B. Weinstein, pp. 43–49, IEEE Sp., 2/84.

"Memory Cards . . . ", Mark Mills, pp. 154–168, Byte Magazine, Jan. 1984.

*Primary Examiner*—Harold I. Pitts
*Attorney, Agent, or Firm*—R. F. Kip, Jr..

[57] ABSTRACT

A transaction card having in it a semiconductor microcomputer with data storing capability is inserted into a receptor having circuitry for interacting with the microcomputer. Operating power and a clock signal for the microcomputer are transferred from the receptor to the card via an inductive coupling between a coil and magnetic core in the receptor and a coil and ferromagnetic member constituting a flexible wafer inductive device ("FWID") in the card. For purposes of data transfer between the card and receptor, the card includes two additional FWIDS which, when the card is in the receptor, are inductively coupled with corresponding coils in the receptor. One of such additional FWIDS is used to transfer data from the microcomputer in the card to a microcomputer in the receptor, while the other additional FWID is used for data transfer in the opposite direction between these two microcomputers. That data transfer is accomplished by modulating the data signal on the clock, inductively transmitting the modulated signal across the discontinuity between the card and the receptor, and then demodulating the modulated signal to recover a replica of the original data signal.

16 Claims, 4 Drawing Figures

COMPUTERIZED TRANSACTION CARD WITH INDUCTIVE DATA TRANSFER

FIELD OF THE INVENTION

This invention relates generally to laminated plastic computerized transaction cards which are carried on the person for use as credit cards or the like, and which include semiconductive microcomputer means adapted to interact with circuitry in a receptor in which the card is placed so as to operate on data stored in memory in the card. More particularly, this invention relates to improvements in cards of such sort for transferring data between the card and a receptor therefor. While the invention will be particularly described in terms of a computerized personal data card ("PDC") designed for use as a telephone credit card and adapted for that purpose to be placed in the card holder unit of a credit card calling telephone terminal ("CCC"), the invention is of general application to computerized transaction cards of which another example without restriction, is a bank card insertable into an automatic teller machine for withdrawing cash from the machine.

BACKGROUND OF THE INVENTION

The credit field has recently seen the emergence of a type of credit card, often referred to as a "smart" card, which includes in it a semiconductive microcomputer adapted to store and process data (relating, for example, to the identity of the card owner), and which card, moreover, is adapted to have transfer of data take place between the microcomputer therein and circuitry in a complementary card receptor. For a survey discussion on cards of such type, reference is made to the article "Smart Credit Cards: the answer to cashless shopping" appearing on pages 43–49 of the February, 1984 issue of the IEEE Spectrum.

In the past, the interaction between the microcomputer in such cards and the circuitry of the receptor in which the card is inserted has, for the most part, been effected by electromechanically coupling the microcomputer and such circuitry through an array of pins extending from the receptor into holes formed in the cards to contact elements in the card. That electromechanical mode of interconnecting the card and receptor has, however, the shortcomings of wear of the contacts, accumulation of dirt therein, and possible vandalism thereof (by, say, exposing them to spray paint) to the point where, often after too short a time, the electromechanical connection becomes inoperative.

In an effort to overcome such deficiencies, U.S. Pat. No. 4,480,178 issued Oct. 30, 1984 in the name of R. R. Miller II, et al for "Tuning Arrangement For Interfacing Credit Card-like Device to a Reader System" and assigned to the assignee hereof, and incorporated herein by this reference, discloses an arrangement in which, for purposes of transferring electrical energy from the receptor to a card therein to supply operating power and a clock signal to the microcomputer in the card, the receptor contains two plate members which respectively register in closely spaced relation with a corresponding two plate members in the card so as to form two capacitors electrically coupling the receptor and card. Power is supplied from the receptor to the card by the use of such capacitive coupling. A problem encountered in such mode of coupling the receptor and card is, however, that, because the size of the capacitor plates of the card must necessarily be small in order to fit within the card and make room for the other elements thereof, the capacitance which can be provided by such card plates and the registering receptor plates is also necessarily small so as to result in certain applications in an undesirably low limit on the amount of electrical energy transferrable between the receptor and card.

As an alternative, U.S. Patent application, Ser. No. 664,555 filed Oct. 25, 1984 in the name of R. L. Billings for "Flexible Inductor", and assigned to the assignee hereof, and incorporated herein by this reference, discloses an arrangement in which, for purposes of transferring electrical energy from the receptor to a card therein to supply operating power and a clock signal to a microcomputer in the card, the card includes a flexible coil and a flexible ferromagnetic member adapted upon insertion of the card in the receptor to inductively couple the coil to transformer primary means in the receptor so that the coil will operate as a transformer secondary and, in that role, transfer operating power and the clock signal from the receptor to the microcomputer in the card. No provision, however, is made in such arrangement for transfer of data between the receptor and the microcomputer of the card.

SUMMARY OF THE INVENTION

The lack of such provision is obviated by the invention hereof which is an improvement on that of the aforementioned Billings application. That is, the invention hereof in one of its aspects is an improvement in a computerized transaction and insertable into a receptor and containing microcomputer means, flexible coil means and flexible ferromagnetic member means juxtaposed in the card with such coil means and adapted when the card is in the receptor to flux link such coil means with inductor means in the receptor for transfer of operating power to the microcomputer means. The improvement comprises circuit means coupled in the card to such coil means and microcomputer means and adapted, when the card is in the receptor, to implement transfer of data between the receptor and such microcomputer means at least partly by a modulated wave which is produced by modulation of a carrier signal by a data signal, and which constitutes at least a component of the waveform of current in such coil means and of magnetic flux linking such coil means and the inductor means in the receptor.

According to the improvement invention hereof in another of the aspects, the mentioned card includes one coil as before for transfer of operating power and a clock signal from the receptor to the microcomputer means in the card and, moreover, at least one other coil, magnetically isolated from the power-transfer coil, for transfer of data between the receptor and the microcomputer means in the card. By having such other coil separate and magnetically isolated from the power-transfer coil for transfer of data, the performance of the data transfer function will not interfere with the even flow of power, and the regularity of the clock signal, fed from the power-transfer coil in the card to the microcomputer means therein.

As yet another aspect of the improvement invention hereof, the data transfer function is effected by the use of two data-transfer coils each included in the card. The use of such two coils makes possible the transfer of data into the microcomputer means and the transfer of data out of the microcomputer means without requiring any special provisions for the time sharing which would be needed if these oppositely directed flows of data were to be effected by the use of the same coil.

BRIEF DESCRIPTION OF DRAWINGS

For a better understanding of the invention, reference is made to the following description of an exemplary embodiment thereof, and to the accompanying drawings wherein.

DESCRIPTION OF THE PREFERRED EMBODIMENT

Figure 1:
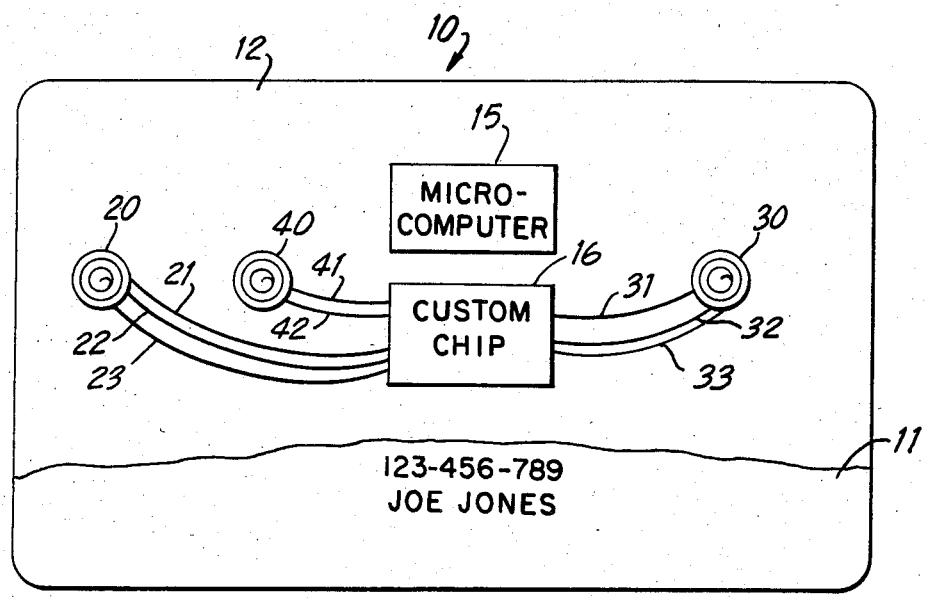
FIG. 1 is a schematic partially-broken away plan view of a computerized transaction card according to the invention.

Referring now to FIG. 1, the reference numeral 10 designates a computerized transaction card in the form of a personal data card ("PDC") adapted for use as a telephone credit card. Card 10 can be resiliently flexed to a degree and has a laminated plastic structure comprising a top synthetic-resinous protective layer 11, a central panel 12 of synthetic resinous material and providing most of the stiffness of the card, and a bottom synthetic-resinous protective layer (not shown). Embedded in panel 12 so as to be covered by layer 11 is a semiconductive microcomputer means 15 which may be, say, a Model No. MC68-HC05C4 microcomputer manufactured by the Motorola Corporation of Chicago, Ill. Similarly embedded in panel 12 is circuit means 16 in the form of a custom-made semiconductive chip incorporating various electric components and circuits for performing functions relating to the operation of microcomputer 16. Leftward of chip 16, there is embedded in panel 12 a flexible multi-turn wire coil 20 coupled by leads 21, 22, 23 to chip 16 and in juxtaposed relation with a flexible ferromagnetic member 25 (FIG. 3) also embedded in that panel. The combination of elements 20 and 25 is known as a flexible wafer inductive device ("FWID").

As so far described, PDC 10 and its elements are (with the exception of certain circuits included in chip (16) already known from the disclosure of the mentioned Billings application to which reference is made for the structural details of FWID 20, 25. Elements 20 and 25 are power-transfer elements of which the power transfer coil 20 is adapted to have induced therein a continuous a.c. current used in card 10 to provide for microcomputer 16 both operating power and a clock signal.

Elements which are not disclosed in the Billings application but are parts of card 10 hereof are a first data-transfer coil 30 connected by leads 31, 32, 33 to chip 16, a first ferromagnetic data-transfer member 35 (FIG. 3) juxtaposed with coil 30, a second data-transfer coil 40 connected by leads 41, 42 to chip 16, and a second ferromagnetic data transfer member 45 (FIG. 3) juxtaposed with coil 40. The elements 30, 35 and 40, 45 are all flexible and form two FWIDS, namely the FWID 30, 35 and the FWID 40, 45 of which each is structurally similar to the FWID 20, 25 (of which the structural details are, as stated, disclosed in the Billings application). Coil 30 is for transmitting from card 10 output data provided by microcomputer 15, whereas coil 40 is for transmitting input data received by card 10 to that microcomputer. As shown in FIGS. 1 and 4, data-transfer coils 30 and 40 and their respectively associated ferrogmagnetic members are spaced on panel 12 away from each other and from power transfer coil 20 and member 25 so that each of FWIDS 20, 25; 30, 35 and 40, 45 is magnetically isolated from the other two FWIDS in the sense that magnetic flux linking the coil of any of such FWID will not, to a significant extent, effect any concurrent operation of either of the other two FWIDS.

Figure 2:
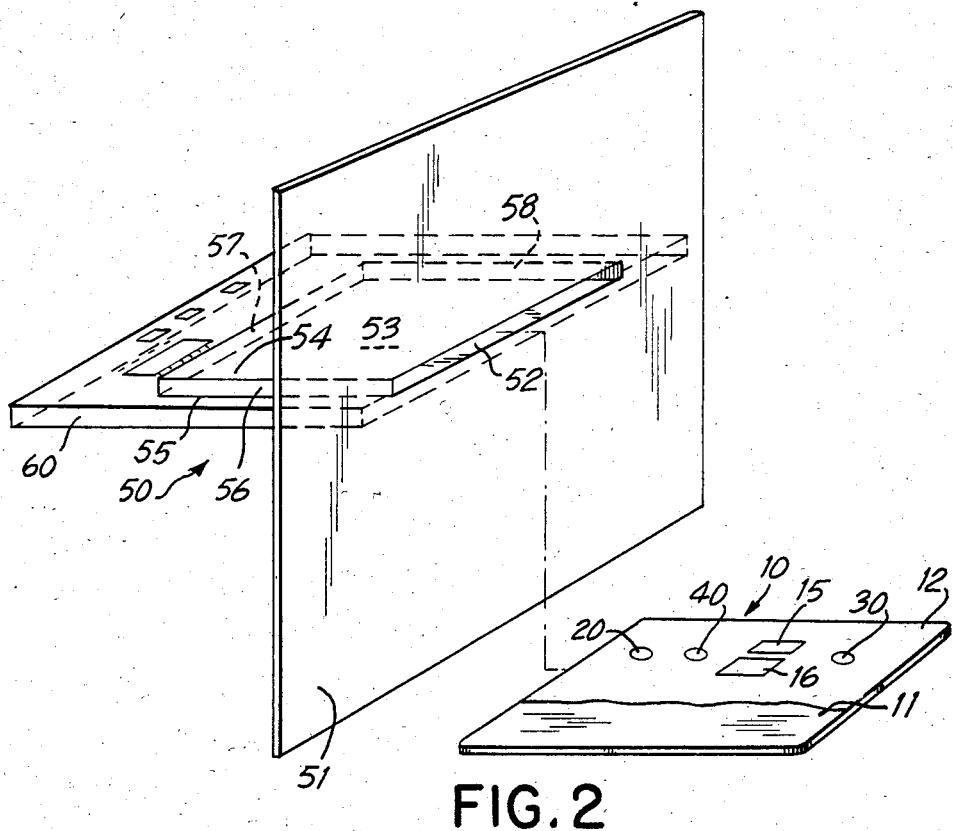
FIG. 2 is a schematic isometric view of apparatus comprising the FIG. 1 card and a receptor into which that card is insertable.

Referring next to FIG. 2, the apparatus shown therein comprises the already described PDC 10 and a card receptor 50 (schematically represented in the figure) in the form of the PDC holding unit of a credit card calling telephone terminal (a "CCC"). Receptor 50 has a front wall in which is formed a rectangular slot 52 providing a front opening for a rectangular receptacle 53 extending inward into receptor 50 from its front wall 51 and matching the shape of card 10 while providing some clearance with respect thereto to permit the card to be inserted therein with an easy sliding fit. Receptacle 53 has top and bottom walls 54 and 55 and three side walls 56, 57, 58 on the three sides of the receptacle other than its front side which is open on account of slot 52. The bottom wall 55 of the receptacle is provided by the upper surface of a printed wiring board 60 presenting beneath the receptacle various electrical means shown in FIG. 3 and to be later described in more detail and which, when card 10 is inserted into receptor 50, are adapted to interact with the electrical means included in card 10. It will evident that, when the card 10 is so inserted into receptor 50, a mechanical and electrical discontinuity 65 (FIG. 3) will exist between the card and the electrical means in the receptor. The manner in which such discontinuity is bridged to permit flow of electrical energy between receptor 50 and card 10 will now be described.

Figure 3:
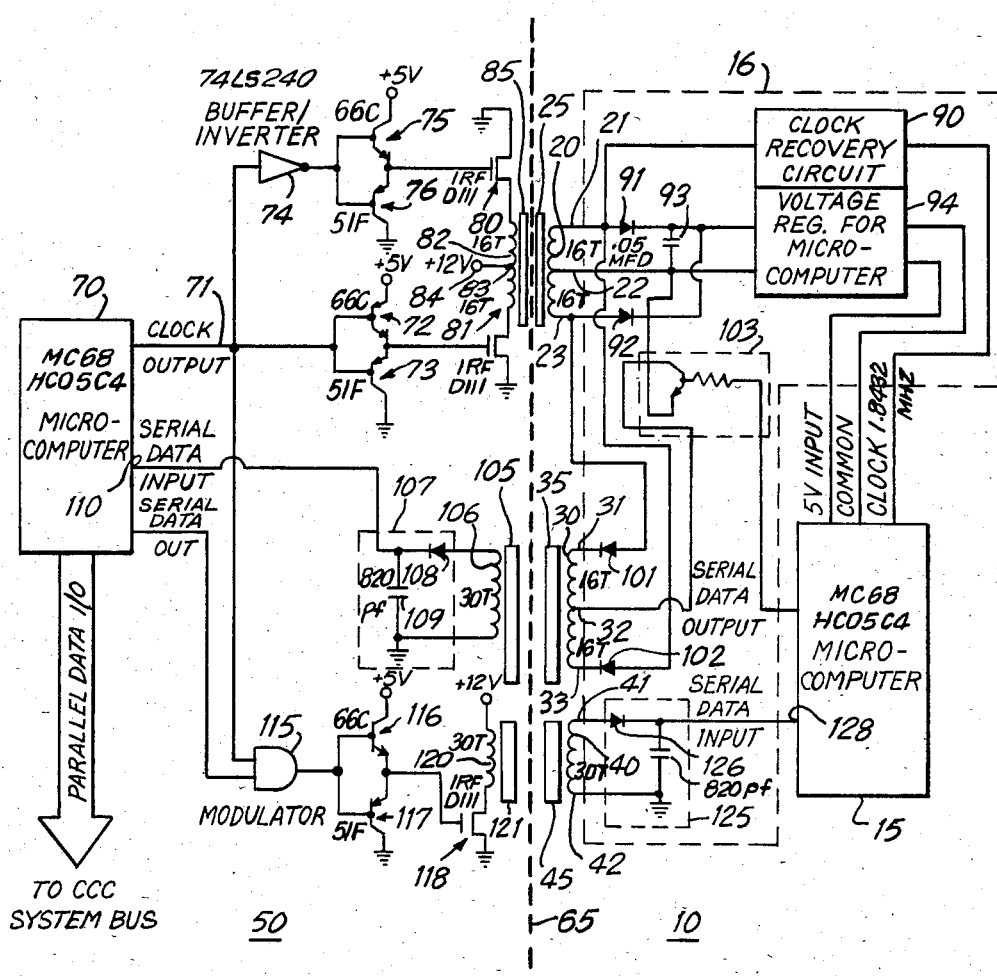
FIG. 3 is a diagram of the circuitry of the card and receptor of FIG. 2.
Figure 4:
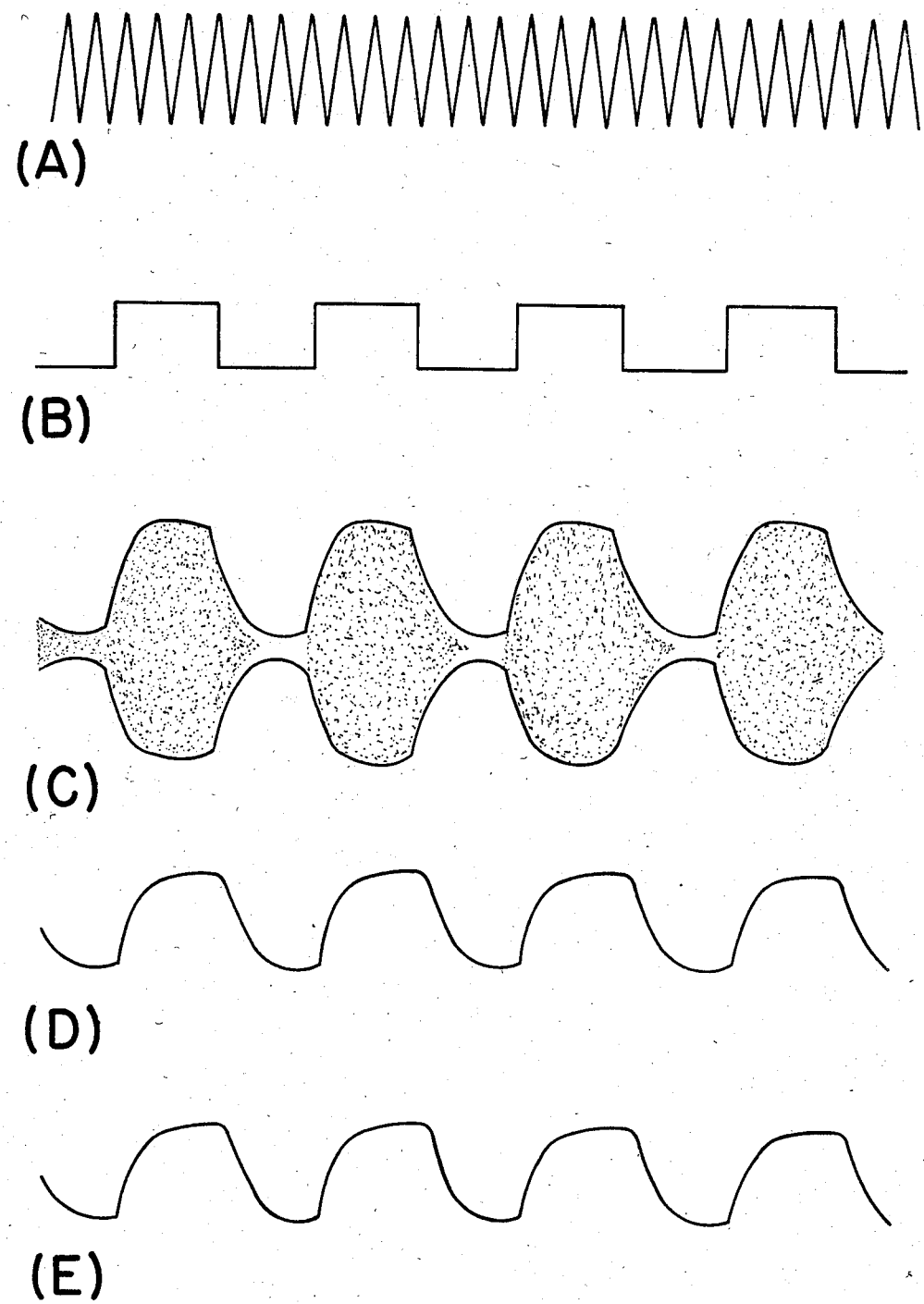
FIGS. 4(a)(b)(c)(d)(e) are diagrams of certain waveforms involved in the operation of the FIG. 3 apparatus.

Referring to FIG. 3, the reference numeral 70 designates a semiconductive microcomputer which is located in receptor 50 and which may be, say, of the same type as microcomputer 15 in card 10. Microcomputer 70 provides on output lead 71 a clock signal of the character shown by waveform A of FIG. 4 and having an exemplary frequency of 1.8432 MHZ and supplied from lead 71 to the inputs of a bipolar transistor pair 72, 73 and via a buffer-inverter stage 74, to the inputs of another bipolar transistor pair 75, 76. Because of the inverting effect of stage 74, the clock signal applied to transistor pair 75, 76 is in 180 degree phase relation with the signal applied to transistor pair 72, 73.

The clock signal is amplified in each of transistor pairs 72, 73 and 75, 76 and is then applied from the respective outputs of these two pairs to the gate electrodes of two respectively corresponding metal oxide semiconductor field effect transistors ("MOSFETS") 80, 81 of which the source-drain paths through them are connected between ground and opposite ends of a center-tapped coil 82 of which the center tap 83 is connected to a voltage source 84. Coil 82 forms part of a transformer primary means in receptor 50 of which the other part of such means is provided by a ferromagnetic core 85 adapted, when card 10 is in receptor 50, to be inductively coupled with FWID 20, 25. Transformer primary means 82, 85 may conveniently be similar in structure to the transformer primary means disclosed in the mentioned Billings application. The driving of MOSFETS 80, 81 by the amplified clock signal produces the flow in coil 82 of alternating current adapted by magnetic flux linkage between transformer primary means 82, 85 and the transformer secondary means 20, 25 to induce a corresponding alternating current at the clock frequency in coil 20 in card 10.

The a.c. voltage appearing in the upper half of coil 20 is applied to a clock recovery circuit 90 which responds to such voltage to supply to microcomputer 15 the clock signal transmitted from microcomputer 70 in receptor 50. The a.c. current in coil 20 is passed via diodes 91, 92 to one side of a filter capacitor 93 connected on its other side to the center tap of the coil, and connected in parallel with the resistive load offered by a voltage regulator circuit 94. Diodes 91, 92, capacitor 93 and such load serve to convert the a.c. current in coil 20 into d.c. energy supplied to regulator circuit 94 and from thence to microcomputer 15 to provide operating power therefor.

Coming now to the circuits exemplary of the improvement invention hereof, opposite ends of the power-transfer coil 20 are connected via diodes 101, 102 to opposite ends of data transfer coil 30 of which the center tap is connected through the collector-emitter path of a modulating transistor 103 to the center tap of coil 20. By virtue of such arrangement, alternate half cycles of a fraction of the a.c. output current from coil 20 flow, respectively, through the two halves on coil 20 and, then, as an a.c. carrier provided by the clock signal, through such collector-emitter path at an amplitude determined by the impedance in that path. Such impedance is varied by a connection of the base electrode of transistor 103 to microcomputer 15 at a port therefor providing an output of data signals which are to be transmitted from that microcomputer to receptor 50, and which are represented by waveform B of FIG. 4. These data signals by the action of transistor 103 modulate the a.c. carrier to produce an amplitude modulated wave of which the waveform is represented in waveform C of FIG. 4, and which waveform is that of the a.c. current flowing through coil 30 (considering together both halves of that coil) and of the magnetic flux produced by that current in the FWID 30, 35.

When card 10 is in receptor 50, such modulated flux in FWID 30, 35 is linked to inductor means in the receptor comprising a ferromagnetic core 105 opposite FWID member 35 and a pick-up coil 106 through which passes the flux in core 105. Elements 105, 106 may conveniently be similar in structure to the aforedescribed elements 85, 82. Because of such flux linkage, the amplitude modulated current in data-transfer coil 30 induces a corresponding amplitude modulated current to pick-up coil 106 so as, insofar as the modulated waveform is concerned, to bridge the discontinuity 65 between the card 10 and receptor 50. Pick-up coil 106 is connected to a demodulator circuit 107 comprising a diode 108 and a filter capacitor 109 connected in series across the coil with capacitor 109 being connected in parallel with the resistive load offered at an input port 110 of microcomputer 70. As depicted by waveform D in FIG. 4, demodulator circuit 107 recovers from the modulated current in coil 106 and supplies to the microcomputer 70 a replica of the original output data signal from microcomputer 15 in card 10. In this way, output data from card 10 is inductively transmitted to the receptor 50.

Transmission of data in the other direction is accomplished as follows. The clock signal on lead 71 in receptor 50 is supplied as one input to a transistor modulator stage 115 to provide flow therein of such signal as an a.c. carrier. Another input of stage 115 receives from microcomputer 70 a data signal also represented by waveform B (FIG. 4). Within stage 115 such data signal modulates the a.c. carrier clock signal therein to produce an amplitude modulated signal of which the waveform is also represented by waveform C, and which is applied from stage 115 to a bipolar transistor pair 116, 117. That transistor pair amplifies such signal and applies the amplified signal to the gate electrode of a MOSFET 118 of which the source-drain path is connected, between ground and a voltage supply, in series with inductor means comprising a coil 120 and a ferromagnetic core 121 for the core. Elements 120, 121 may conveniently be similar in structure to the aforedescribed elements 82, 85. The driving of MOSFET 118 by the amplified modulator signal produces in coil 120 a modulated wave of the waveform is reflected in the flow of current through that coil and in the magnetic flux produced by that current in core 121.

When card 10 is in receptor 50, core 121 is disposed opposite the ferromagnetic member of FWID 40, 45 in card 10 so as to flux link the coil 40 of that FWID with the coil 120 in the receptor. As a result, the flow of modulated current in coil 120 induces in coil 40 a corresponding modulated current so as, in that way, to bridge the discontinuity 65 between receptor 50 and card 10 for purposes of transmission of data signals from the former to the latter.

The modulated current in coil 40 is supplied to a demodulator stage 125 comprising a diode 126 connected in series with a filter capacitor 127 which is turn connected in parallel with a resistive load offered at an input port 128 to microcomputer 15 in card 10. Stage 125 demodulates the modulated current in coil 40 to recover therefrom and supply to such port 128 the replica of the data signals from microcomputer 70 of which waveform E of FIG. 4 provides a representation. Thus, when card 10 is in receptor 50, data signals can be inductively transmitted not only from the card to the receptor but also from the receptor to the card. Other advantages are tht such transmission of data by such inductive transfer means can be implemented by straight forward associated circuitry, and that, when two data-transfer coils are used, simultaneous data transfer can take place in opposite directions without any need for time sharing.

It will be appreciated that such transmission of data signals between the card and the receptor by inductive data transfer means isolated from the means for transferring power and/or a clock signal from the receptor to the card has the advantages of not being subject to the limitations of capacitive transfer of such data signals and, moreover, of avoiding interference with the flow of power and/or the clock signal to the card.

The above described embodiment being exemplary only, it will be understood that additions thereto, omissions therefrom and modifications thereof can be made without departing from the spirit of the invention. Accordingly, the invention is not to be considered as limited save as is consonant with the recitals of the following claims.

What is claimed is:

1. The improvement in a computerized transaction card insertable in a receptor therefor and containing microcomputer means, a power-transfer coil, and a power-transfer ferromagnetic member adapted when said card is in said receptor to flux link said coil with transformer primary means in said receptor for transfer of energy from said receptor to said microcomputer means to provide therefor both operating power and a clock signal transmitted to said coil from said receptor, said improvement comprising: a data-transfer coil in said card, a data-transfer ferromagnetic member juxtaposed in said card with said data-transfer coil, such coil and member being spaced in said card away from said power-transfer coil and member to be magnetically isolated therefrom and said data-transfer member being adapted when said card is in said receptor to flux link said data-transfer coil with inductor means in said receptor, and circuit means coupled to said card with said data-transfer coil for implementing transfer of data between said receptor and microcomputer means at least partly by a modulated wave which is produced by modulation of a carrier signal by a data signal, and which constitutes at least a component of the waveform both of current in said data-transfer coil and of magnetic flux linking such coil with said inductor means.

2. The improvement according to claim 1 in which such two coils and such two members are all flexible to reduce the chance of breakage thereof upon bending of said card.

3. The improvement according to claim 1 in which the carrier signal of said modulated wave is provided by said clock signal.

4. The improvement according the claim 1 in which said data signal appears in said modulated wave as amplitude modulation of said carrier signal.

5. The improvement according to claim 1 in which said data-transfer coil and member are parts of transformer primary means included in said card and adapted when said card is in said receptor to induce current in said inductor means, and in which said circuit means is responsive to said carrier signal and to output data from said microcomputer means to modulate said carrier signal by an output data signal derived from said output data, and to produce flow of the resulting modulated signal through said data-transfer coil in the form of current therein.

6. The improvement according to claim 5 in which said circuit means is electrically coupled in said card to receive the clock signal transmitted to said power-transfer coil, and in which said circuit means utilizes such clock signal as the carrier signal which is modulated by said output data signal.

7. The improvement according to claim 5 further comprising, an additional coil in said card, an additional ferromagnetic member juxtaposed in said card with such coil, said additional coil and member being spaced in said card away from said power-transfer coil and member and said data-transfer coil and member to be magnetically isolated from each of them, and said additional member being adapted when said card is in said receptor to inductively couple said additional coil with an inductor in said receptor adapted to induce in such coil, as current, a modulated wave produced by modulation in said receptor of a carrier signal by an data signal, and in which said circuit means in said card further comprises demodulator means for recovering said data signal from the modulated wave induced in said additional coil, and for transmitting the recovered data signal to said microcomputer means.

8. The improvement according to claim 1 in which said data-transfer coil is adapted when said card is in said receptor to have said modulated wave induced therein, as current in such coil, by the operation of said inductor means in said receptor, and in which said circuit means comprises demodulator means responsive to such modulated wave current in such data-transfer coil to recover from such wave said data signal and to transmit such data signal to said microcomputer means.

9. The improvement in a computerized transaction card insertable into a receptor therefor and containing microcomputer means, a flexible power-transfer coil and a flexible ferromagnetic power-transfer member juxtaposed in said card with said power-transfer coil and adapted when said card is in said receptor to flux link said coil with transformer primary means in said receptor for transfer of operating power from said receptor to said microcomputer means, said improvement comprising a flexible data-transfer coil in said card, a flexible ferromagnetic data-transfer member juxtaposed in said card with said data-transfer coil and adapted when said card is in said receptor to flux link said data-transfer coil with inductor means in said receptor, and circuit means in said card comprising modulator means responsive to output data from said microcomputer means and to a carrier signal to modulate such carrier signal by an output data signal derived from said output data and to produce flow of the resulting modulated wave through such data-transfer coil in the form of current therein so as to induce said modulated wave in said inductor means.

10. The improvement according to claim 9 in which said first data-transfer coil and member are spaced in said card away from said power-transfer coil and member to be magnetically isolated therefrom.

11. The improvement according to claim 9 in which such two coils are both center-tapped coils, and in which said circuit means comprises, a pair of diodes connecting opposite ends of said power-transfer coil to opposite ends of said data-transfer coil so as to pass alternating current induced in said power-transfer coil to said data transfer coil, means providing a circuit path for flow of such current between the center tap of said power-transfer coil and that of said data-transfer coil, and variable impedance means interposed in said path between such two center taps and responsive to said output data to vary the impedance in said path so as to modulate by such output data such current in said data-transfer coil.

12. The improvement according to claim 9 further comprising an additional flexible data-transfer coil in said card, an additional flexible ferromagnetic data-transfer member juxtaposed in said card with said second coil, said additional member being adapted when said card is in said receptor to flux link said additional coil with inductor means in said receptor and adapted for inducing as current in said additional coil a modulated wave comprising a carrier signal modulated by an input data signal, and circuit means in said card comprising demodulator means coupled to said additional data-transfer coil and to said microcomputer means for recovering such data signal from said modulated wave in said additional coil and for supplying said recovered additional data signal to said microcomputer means as input data thereto.

13. The improvement according to claim 12 in which said additional data-transfer coil and member are spaced in said card away from each of said power-transfer coil and member and said first-named data-transfer coil and member to be magnetically isolated from each thereof.

14. The improvement in a computerized transaction card insertable into a receptor therefor and containing microcomputer means, a flexible power-transfer coil, and a flexible ferromagnetic power-transfer member juxtaposed in said card with such coil and adapted when said card is in said receptor to flux link said coil with transformer primary means in said receptor for transfer of operating power from said receptor to said microcomputer means, said improvement comprising, a flexible data-transfer coil in said card, a flexible ferromagnetic data-transfer member juxtaposed in said card with such coil and adapted when said card is in said receptor to flux link such coil with inductor means in said receptor and adapter for inducing as current in said data-transfer coil a modulated wave comprising a carrier signal modulated by a data signal, said data transfer coil and data-transfer member being spaced in said card away from said power-transfer coil and member to be magnetically isolated therefrom, and circuit means in said card comprising demodulator means coupled to said data transfer coil and to said microcomputer means for recovering said data signal from said modulated wave in said data transfer coil and for supplying said recovered data signal to said microcomputer means as input data thereto.

15. The improvement in a computerized transaction card insertable into a receptor and containing microcomputer means, flexible coil means and flexible ferromagnetic member means juxtaposed in said card with said coil means and adapted when said card is in said receptor to flux link said coil means with inductor means in said receptor for transfer of operating power to said microcomputer means, said improvement comprising circuit means coupled in said card to said coil means and microcomputer means and adapted when said card is in said receptor to implement transfer of data between said receptor and microcomputer means at least partly by a modulated wave which is produced by modulation of a carrier signal by a data signal, and which constitutes at least a component of the waveform of current in said coil means and of magnetic flux linking said coil means and inductor means.

16. Apparatus comprising card receptor means, a computerized transaction card insertable in said receptor means and containing microcomputer means, flexible coil means and flexible ferromagnetic member means juxtaposed in said card with said coil means, inductor means disposed in said receptor means and adapted when said card is inserted therein to be flux linked by said ferromagnetic member means with said coil means circuit means in said card means and coupled to said coil means and microcomputer means for implementing transfer of data between such microcomputer means and said receptor means at least partly by a modulated wave which is produced by modulation of a carrier signal by a data signal, and which constitutes at least a component of a waveform of current in said coil means and inductor means and of magnetic flux in such two means, and circuit means in said receptor means for implementing such transfer of data at least partly by such modulated wave.

* * * * *